(12) United States Patent
Wu et al.

(10) Patent No.: US 9,129,413 B2
(45) Date of Patent: Sep. 8, 2015

(54) METHOD AND DEVICE FOR ALIGNING A PLURALITY OF DIGITAL PICTURES

(75) Inventors: Shiqian Wu, Singapore (SG); Susanto Rahardja, Singapore (SG); Zhengguo Li, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 397 days.

(21) Appl. No.: 13/572,361

(22) Filed: Aug. 10, 2012

(65) Prior Publication Data
US 2013/0044127 A1    Feb. 21, 2013

(30) Foreign Application Priority Data

Aug. 15, 2011 (SG) ................. 201105851-8

(51) Int. Cl.
| | |
|---|---|
| G09G 5/00 | (2006.01) |
| G06T 5/50 | (2006.01) |
| G06K 9/00 | (2006.01) |
| G06K 9/32 | (2006.01) |
| G06T 5/00 | (2006.01) |
| G06T 7/00 | (2006.01) |

(52) U.S. Cl.
CPC . *G06T 5/50* (2013.01); *G06T 5/009* (2013.01); *G06T 7/0034* (2013.01); *G06T 2207/10144* (2013.01); *G06T 2207/20016* (2013.01); *G06T 2207/20208* (2013.01)

(58) Field of Classification Search
CPC ....................................................... G06K 9/32
See application file for complete search history.

(56) References Cited

U.S. PATENT DOCUMENTS

| | | | |
|---|---|---|---|
| 2009/0245593 A1* | 10/2009 | Suzuki et al. | 382/115 |
| 2012/0002890 A1* | 1/2012 | Mathew | 382/232 |

OTHER PUBLICATIONS

Xiaoyang Tan et al , "Enhanced Local Texture Feature Sets for Face Recognition Under Difficult Lighting Conditions", S.K. Zhou et al. (Eds.): AMFG 2007, LNCS 4778, pp. 168-182, Springer-Verlag Berlin Heidelberg 2007.*
Andreas Nüchter et al "Linearization of Rotations for Globally Consistent n-Scan Matching", 2010 IEEE International Conference on Robotics and Automation Anchorage Convention District May 3-8, 2010, Anchorage, Alaska, USA, http://ieeexplore.ieee.org/stamp/stamp.jsp?tp=&arnumber=5509306.*

* cited by examiner

*Primary Examiner* — Tize Ma
(74) *Attorney, Agent, or Firm* — K. David Crockett, Esq.; Niky Economy Syrengelas, Esq.; Crockett & Crockett, PC (57) ABSTRACT

A method for aligning a plurality of first digital pictures. Each first digital picture includes a plurality of pixels wherein each pixel is associated with a pixel value. The method includes generating a second digital picture for each first digital picture. Generating the second digital picture for the first digital picture includes determining, for each of a plurality of pixels of the first digital picture, a number representing the pixel values of a plurality of pixels in a neighborhood of the pixel relatively to the pixel value of the pixel. The method further includes assigning the number as a pixel value to a pixel of the second digital image corresponding to the pixel of the first digital image. The method further includes generating aligning parameters based on the plurality of second digital pictures. The method further includes aligning the plurality of first digital pictures based on the aligning parameters.

17 Claims, 5 Drawing Sheets

METHOD AND DEVICE FOR ALIGNING A PLURALITY OF DIGITAL PICTURES

The present application claims the benefit of the SG patent application 201105851-8 (filed on 15 Aug. 2011), the entire contents of which are incorporated herein by reference for all purposes.

TECHNICAL FIELD

Embodiments relate generally to a method and a device for aligning-a plurality of digital pictures.

BACKGROUND

High dynamic range (HDR) images have been gaining wide applications in the field of image processing, computer graphics and virtual reality to simulate the real world. The most popular approach for HDR generation is to synthesize an HDR image from several low dynamic range (LDR) images with different exposures. It is crucial to align the LDR images due to camera movement to avoid blurred HDR images.

Image alignment or registration has been a fundamental problem in image processing and computer vision. Although a large number of techniques have been proposed, the registration methods may be generally classified into two categories: pixel-based (intensity-based/area-based) algorithms and feature-based algorithms. Intensity-based methods use pixel-to-pixel matching to find a parametric transformation between two images. For feature-based methods, distinctive features from each image is extracted first before matching and warping the features and images according to parametric transformations estimated from those correspondences. As feature-based methods do not work directly with image intensities, it is more suitable for situations when illumination (intensity) changes are expected.

Different from the conventional cases of varying illumination, in which each image is best captured, the underlying images with different exposures for HDR synthesis have great variations of intensities to represent the whole dynamic range of real scenes. Specifically, the sequence of images for HDR generation contains severely under-exposed and over-exposed images. The large variations of intensities pose difficulty in using intensity-based method for image alignment. Also, the saturation or near saturation offers great challenge to use feature-based method because one feature detected in an image may not occur in another one. The situation is more challenging for both intensity-based method and feature-based method if dynamic scenes are considered, because the content change leads to difficulty in detecting consistent features.

Currently, some techniques have been adopted to align a set of differently exposed images. The SIFT (scale-invariant feature transform) method was employed to detect the feature points (key points) in the LDR images, then the RANSAC (RANdom SAmple Consensus) method was used to find the best pairs of key points and derived the transform parameters. An improved SIFT method has been proposed to detect corners as the feature points. To alleviate the effect of intensity variation on extracting feature points, both SIFT methods work in contrast domain. Meanwhile, intensity-based methods were employed for the extraction of feature points. To cope with intensity difference, researchers proposed to convert all LDR images to the identical exposure via the camera response function (CRF). This implies that the CRF has to be known before registration in the two approaches, which is not the usual case in HDR composition. Conventionally, LDR images are correlated by the empirical "preferred" comparametric model, and the spatial and tonal registrations were simultaneously performed by optimization, for example, a Levenberg-Marquardt algorithm. It is noted that this method contains large number (9(q−1) parameters where q is the number of LDR images) of parameters to be estimated simultaneously. Generally, the optimization in high dimensions may not guarantee global solution and the search speed is very slow. To mitigate the computation burden, an improved solution using the piecewise linear comparametric model was proposed.

Different from aforementioned registrations, a scheme called median threshold bitmap (MTB) was proposed to convert each LDR image into a binary one, based on which alignment was performed. This algorithm is popular to align differently exposed images because it is fast and useful to solve image alignment for translational movement. It is then extended to rotational alignment. However, the MTB has the following drawbacks. Firstly, much information of the original images is lost by the simple median threshold. Secondly, the conversion is very sensitive to noise, especially for the pixels near the median value. Thirdly, such conversion is definitely not accurate if the median value is saturated for over-exposed and under-exposed images.

SUMMARY OF THE INVENTION

Various embodiments provide a method and a device for aligning a plurality of digital pictures which solves at least partially the above mentioned problems.

In one embodiment, a method for aligning a plurality of first digital pictures is provided. Each first digital picture includes a plurality of pixels wherein each pixel is associated with a pixel value. The method may include generating a second digital picture for each first digital picture. In one embodiment, generating the second digital picture for the first digital picture may include determining, for each of a plurality of pixels of the first digital picture (e.g. for a subset of the pixels of the first digital picture), a number representing the pixel values of pixels in a neighborhood of the pixel relatively to the pixel value of the pixel. The method may further include assigning the number as a pixel value to a pixel of the second digital image corresponding to the pixel of the first digital image. The method may further include generating alignment parameters based on the plurality of second digital pictures. The method may further include aligning the plurality of first digital pictures based on the aligning parameters.

In one embodiment, a device for aligning a plurality of first digital pictures is provided. Each first digital picture may include a plurality of pixels wherein each pixel is associated with a pixel value. The device may include a first generator configured to generate a second digital picture for each first digital picture. In one embodiment, generating the second digital picture for the first digital picture may include determining, for each of a plurality of pixels of the first digital picture, a number representing the pixel values of pixels in a neighborhood of the pixel relatively to the pixel value of the pixel. The device may further include an assigning unit configured to assign the number as a pixel value to a pixel of the second digital image corresponding to the pixel of the first digital image. The device may further include a second generator configured to generate alignment parameters based on the plurality of second digital pictures. The device may further include an alignment unit configured to align the plurality of first digital pictures based on the alignment parameters.

It should be noted that the embodiments described in the dependent claims of the independent method claim are analogously valid for the corresponding device claim where applicable, and vice versa.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. In this regard, directional terminology, such as "top", "bottom", "front", "back", "leading", "trailing", etc, is used with reference to the orientation of the Figure(s) being described. Because components of embodiments may be positioned in a number of different orientations, the directional terminology is used for purposes of illustration and is in no way limiting. Other embodiments may be utilized and structural, logical, and electrical changes may be made without departing from the scope of the invention. The various embodiments are not necessarily mutually exclusive, as some embodiments may be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

Figure 1:
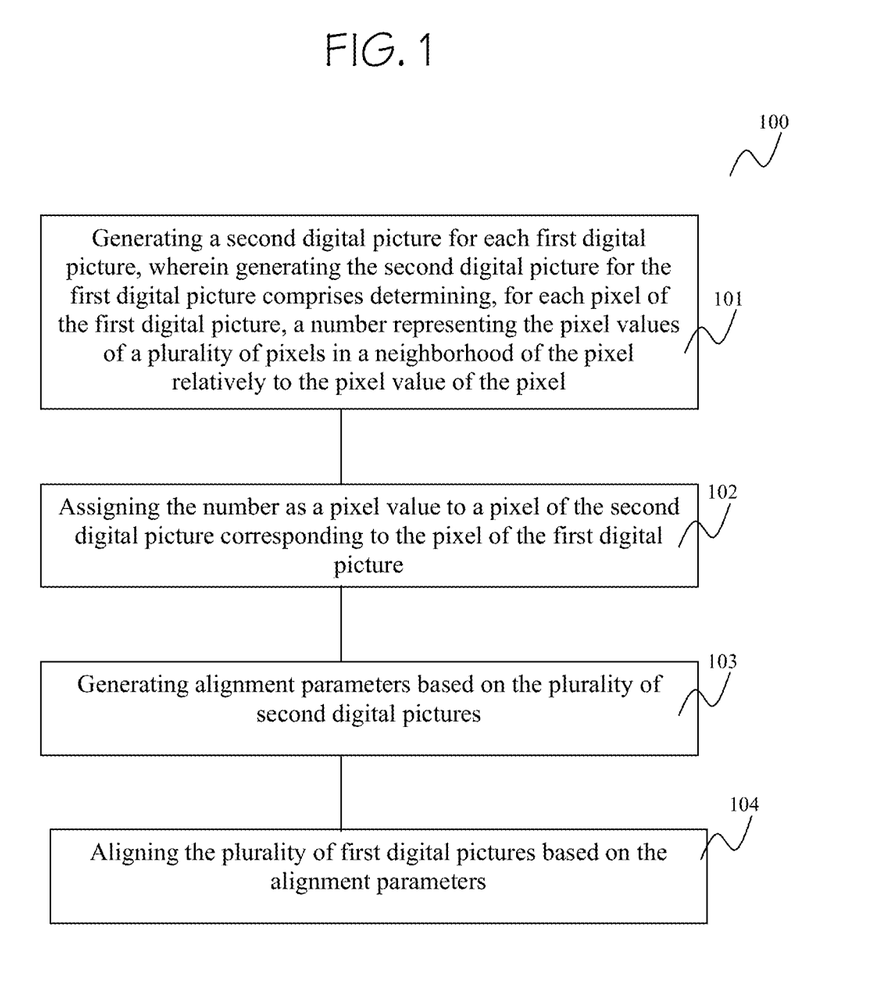
FIG. 1 shows a method for aligning a plurality of first digital pictures in one embodiment.

FIG. 1 illustrates a method 100 for aligning a plurality of first digital pictures according to one embodiment. Each first digital picture may include a plurality of pixels wherein each pixel is associated with a pixel value. The method 100 includes 101 generating a second digital picture for each first digital picture. Generating the second digital picture for the first digital picture may include determining, for each of a plurality of pixels of the first digital picture (e.g. for each pixel of the first digital picture or for a subset of pixels of the first digital picture), a number representing the pixel values of pixels in a neighborhood of the pixel relatively to the pixel value of the pixel. The method 100 further includes 102 assigning the number as a pixel value to a pixel of the second digital image corresponding to the pixel of the first digital image. The method 100 may further include 103 generating alignment parameters based on the plurality of second digital pictures. The method 100 may further include 104 aligning the plurality of first digital pictures based on the aligning parameters.

In other words, in one embodiment, a plurality of first digital pictures may be processed to generate an aligned digital picture (i.e. an output image). Each first digital picture may include a plurality of pixels wherein each pixel is associated with a pixel value. The plurality of first digital pictures may be a set of digital pictures taken for a same scene under different exposures or lighting conditions, and taken at different angles such that the same scene is arbitrarily rotated in each picture, for example. The method may be used to align the plurality of the first digital pictures. In one embodiment, the method includes generating a second digital picture for each first digital picture of the plurality of first digital pictures. For each pixel (x, y) of a first digital picture, a number which represents the pixel values of pixels in a neighborhood of the pixel (x, y) relatively to the pixel value of the pixel (x, y) may be determined. For example, a string of numbers representing the pixel values of pixels (x+1, y), (x−1, y), (x, y+1), and (x, y−1) in the neighborhood of (x, y) relatively to the pixel value of pixel (x, y) may be determined. However, a person skilled in the art would appreciate that the number may be determined based on more or less number of neighborhood pixels of pixel (x, y). A person skilled in the art would also appreciate that the calculation of the number is not limited above and may be based on other pixels (e.g. (x+1, y+1), (x+1, y−1), (x−1, y+1), and (x−1, y−1)) in the neighborhood of (x, y) as well. The number determined for the pixel (x, y) for the first digital picture may be assigned as the pixel value to a pixel (x, y) of the second digital picture corresponding to the pixel (x, y) of the first digital picture. The number determined for pixel (x, y) of the first digital picture may reveal the image microstructure in the area around pixel (x, y). After generating a second digital picture for each of the plurality of first digital pictures, alignment parameters may be determined based on the generated plurality of second digital pictures. The alignment parameters may include for example transition in x direction between two first digital pictures, transition in y direction between first digital pictures, and rotation angle between two first digital pictures. The alignment process may for example be carried out firstly between two first digital pictures, and the resulted aligned digital picture may be used to align with a further first digital picture of the plurality of first digital pictures. The process may continue until all the first digital pictures are processed.

For example, according to one embodiment, differently exposed first images are aligned by normalization of the differently exposed images and alignment of normalized images. For example, the differently exposed first images are first normalized using bidirectional intensity mapping function (IMF), then the normalized images are coded by a local-ternary-pattern (LTP) method to generate a LTP-coded image (i.e. a second image) for each first image, which represents the consistent micro-structures of the first image. Based on the LTP-coded second images, a linear model derived from Taylor extension may be employed to estimate transform parameters (in other words aligning parameters) for aligning the first images. For example, to improve accuracy and robustness, image rotation is initially detected by histogram-based matching, and both the coarse-to-fine technique by Gaussian Pyramid and the idea of progressive image alignment are implemented to cope with large camera movement and large intensity variations. To further improve efficiency, the alignment can be performed by cropped images. It can be shown by experiments carried out on a variety of static and dynamic images that the method according to various embodiments as for example described below is robust and significantly outperforms the conventional methods and the popular HDR tools.

In one embodiment, determining, for each of a plurality of pixels of the first digital picture, a number representing the pixel values of pixels in the neighborhood of the pixel relatively to the pixel value of the pixel includes determining a relative value for each pixel of pixels in the neighborhood of the pixel based on comparison of the pixel value of the pixel and the pixel value of the pixel in the neighborhood of the pixel. This embodiment is further illustrated with reference to equation (3). In one embodiment, determining, for each of a plurality of pixels of the first digital picture, a number representing the pixel values of pixels in the neighborhood of the pixel relatively to the pixel value of the pixel further includes determining the number representing the pixel values of pixels in the neighborhood of the pixel relatively to the pixel value of the pixel based on the determined relative values. This embodiment is further illustrated with reference to equation (4).

In a further embodiment, determining a relative value for a pixel in the neighborhood of the pixel based on comparison of the pixel value of the pixel and the pixel value of the pixel in the neighborhood of the pixel includes determining a difference between the pixel value of the pixel and the pixel value of the pixel in the neighborhood of the pixel, and comparing the difference with a threshold value. In a further exemplary embodiment, when the difference is larger than the threshold value, the relative value is determined to be a first pre-determined value. When the absolute value of the difference is smaller than or equal to the threshold value, the relative value is determined to be a second pre-determined value. When the difference is smaller than opposite of the threshold value, the relative value is determined to be a third pre-determined value. This embodiment is further illustrated with reference to equation (3).

In one embodiment, the number representing the pixel values of pixels in the neighborhood of the pixel relatively to the pixel value of the pixel is determined to be sum of the relative value for each pixel of the pixels in the neighborhood of the pixel. In a further embodiment, each relative value is weighed differently. This embodiment is further illustrated with reference to equation (4).

In one embodiment, the threshold value is determined based on a comparagram which is a two-dimensional joint histogram between a reference first digital picture and a target first digital picture of the plurality of first digital pictures. In a further embodiment, the method 100 further includes determining, for each pixel value of the reference first digital picture, a majority pixel value in the target first digital picture mapping from the reference first digital picture based on the comparagram. This embodiment is further illustrated with reference to equation (5).

In one embodiment, the threshold value is determined based on a histogram for the target first digital picture. This embodiment is further illustrated with reference to equation (6).

In one embodiment, generating the second digital picture for the first digital picture comprises normalizing the exposure of the first digital picture and generating the second digital picture based on the first digital picture with normalized exposure.

The first digital picture may for example be normalized by a bidirectional intensity mapping function (e.g. in terms of its intensity).

Generating the second digital picture for the first digital picture may comprise reducing the size of the first digital picture and generating the second digital picture for the first digital picture with reduced size. In other words, the generation of the second digital pictures (and thus the generation of the alignment parameters) may be performed based on cropped versions of the first digital pictures.

In one embodiment, the aligning parameters include translation in a first direction (e.g. x direction), translation in a second direction (e.g. y direction), and rotation angle, wherein the first direction is orthogonal to the second direction.

In one embodiment, the aligning parameters are approximated using Taylor series. This embodiment is further illustrated with reference to equations (12) to (16).

In one embodiment, generating the aligning parameter of translation in the first direction and the aligning parameter of translation in the second direction includes generating reduced density second digital pictures. This embodiment is further illustrated with reference to equations (17) to (19).

In one embodiment, generating the aligning parameter of rotation angle includes determining, for each second digital picture, a histogram in a first direction and a histogram in a second direction for each second digital picture, the first direction being orthogonal to the second direction. This embodiment is further illustrated with reference to equations (20) to (24).

In one embodiment, aligning the plurality of first digital pictures starts from the first digital pictures which have relatively low saturation.

Figure 2:
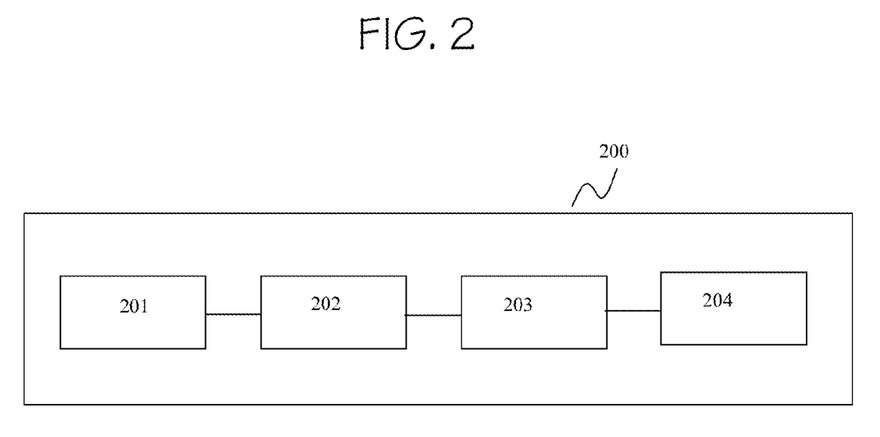
FIG. 2 shows a device for aligning a plurality of first digital pictures in one embodiment.

FIG. 2 shows a device 200 for aligning a plurality of first digital pictures according to one embodiment. Each first digital picture includes a plurality of pixels wherein each pixel is associated with a pixel value. The device 200 may correspond to the method 100 as described herein.

The device 200 may include a first generator 201 configured to generate a second digital picture for each first digital picture. Generating the second digital picture for the first digital picture includes determining, for each of a plurality of pixels of the first digital picture, a number representing the pixel values of pixels in a neighborhood of the pixel relatively to the pixel value of the pixel. The device 200 may further include an assigning unit 202 configured to assign the number as a pixel value to a pixel of the second digital image corresponding to the pixel of the first digital image. The device 200 may further include a second generator 203 configured to generate aligning parameters based on the plurality of second digital pictures. The device 200 may further include a aligning unit 204 configured to align the plurality of first digital pictures based on the aligning parameters.

The method for aligning a plurality of first digital pictures as described herein will now be described according to various exemplary embodiments as follows.

According to one embodiment, the method includes carrying out an algorithm for alignment of differently exposed images that comprises a normalization module and an alignment module. The normalization module computes rotation and translations by using cropped images rather than full images. Normally, a large cropped image size increases robustness but reduces speed of the algorithm. Since there are possibly under-exposed and/or over-exposed regions, especially moving objects in the input images, the cropped image size is selected as half of the original image size. A smaller cropped window size, such as one quarter of the full image size can be selected to align differently exposed images of static scenes. To reduce/remove possibly large intensity changes among input images, a bidirectional approach is introduced to normalize all cropped images. The concept of local ternary pattern (LTP) is further adopted to extract local gray-level structures of normalized cropped images such that the robustness of the proposed algorithm with respect to over/underexposed regions is further improved. A linear optimization based algorithm together with coarse-to-fine technique and histogram based matching is then adopted to estimate the rotation and translations by using the LTP codes of cropped images. Finally, all original input images are aligned by using the estimated rotation and translations based on the idea of progressive image alignment.

The function of a digital camera is to convert scene radiance E into intensity image Z in a specific exposure time $\Delta t$, which may be modeled as follows:

$$Z = \Psi(E \Delta t) \quad (1)$$

where $\Psi$ is called the camera response function (CRF) and it may be assumed to be a monotonically increasing function.

Assume that a sequence of images for the same scene but in different exposure times $I_k \in \mathbb{R}^{M \times N}$ (k=1, 2, ... q), where M is the image height, N is the image width and q is the number of images, are captured. If the CRF $\Psi$ is known, an image in a first exposure may then be converted into an image in a second exposure, and the q images with different exposure times may thus be normalized to a specific exposure. Yet, the computation of CRF is not easy because it is a nonlinear function.

According to one embodiment, an alternative solution called image mapping function (IMF) for establishing relationship between differently exposed images is used. The IMF is employed to normalize differently exposed images because this method can work without image alignment.

Given two images $I_1, I_2 \in \mathbb{R}^{M \times N}$ with the approximate scene in exposure time $\Delta t_1, \Delta t_2$ respectively, without loss of generality, $\Delta t_1$ is assumed to be larger than $\Delta t_2$. $Z(x, y)$ represents the intensity in position $(x, y)$. A bidirectional mapping method is introduced to normalize $I_1, I_2$ as follows:

$$\overline{Z}_1(x, y) = \begin{cases} Z_1(x, y) & \text{if } Z_1(x, y) > Z_0 \\ f_{12}(Z_1(x, y)) & \text{otherwise} \end{cases} \quad (2)$$

$$\overline{Z}_2(x, y) = \begin{cases} f_{21}(Z_2(x, y)) & \text{if } Z_2(x, y) > f_{12}(Z_0) \\ Z_2(x, y) & \text{otherwise} \end{cases}$$

where $Z_0$ is a pre-defined intensity, $f_{ij}(Z)$ (i, j=1 or 2) is the IMF which mapping intensities in image $I_i$ to image $I_j$. The IMF can be calculated by their corresponding cumulative histograms. According to one embodiment, Local-ternary-pattern coded images are generated for the images of the sequence of images. This is explained in the following.

Let P be a pixel with intensity $Z(P)$, and $Q(j)$ (j=1, 2, 3, 4) the 4-connected neighborhood. The local ternary pattern (LTP) S of pixel P is performed as follows:

$$S(j) = \begin{cases} 2 & \text{if } Q(j) - Z(P) > \delta \\ 1 & \text{if } -\delta \leq Q(j) - Z(P) \leq \delta \\ 0 & \text{if } Q(j) - Z(P) < -\delta \end{cases} \quad (3)$$

where $\delta$ is a pre-defined parameter and can be seen as a threshold value. S may be referred to as local ternary pattern (LTP) S of pixel P.

It can be seen that the equation (3) transforms the intensity $Z(P)$ into local ternary pattern (LTP), a ternary string $T(P)$ at pixel P, which represents the relative intensities in its neighborhood instead of the absolute intensity.

It is worth mentioning that the local pattern in equation (3) is ternary instead of binary. This is because the LTP representation is more resistant to noise and error resulted from imaging system and image processing, for example, quantization, interpolation and so on. Using equation (3), the normalized images $\overline{I}_k \in \mathbb{R}^{M \times N}$ (k=1, 2, ... q) by the IMF are further uniquely represented by LTP-coded or feature images $F_k \in \mathbb{R}^{M \times N}$ (k=1, 2, ... q), in which each element is calculated as follows $$T(P) = \sum_{j=0}^{3} S(j) 3^j \quad (4)$$

It can be seen that the 3-value coded intensities are in range of [0, 80].

According to one embodiment, cropped feature images $\overline{F}_k \in \mathbb{R}^{M_1 \times N_1}$ (k=1, 2, ... q) are used for alignment. This is described in the following.

A sequence of images in different exposure is usually captured in short time. This situation makes it possible to track camera movement using 2-D Euclidean transform. As rigid body motion is assumed in in-plane motion, the three parameters, rotation, translations in x, y directions are always same in motion plane. Hence, we can crop small part of the images to achieve fast image alignment.

It is noted that the input images might include moving objects and there are over/under exposed regions in the input images. The size of cropped images cannot be too small. It is recommended that the size of cropped images is from one quarter of the original image size to the full image size. If the size of input images is less than (1280×960) pixels, the size of cropped images is equal to the full image size. Otherwise, the cropped window is defined as follows:

$$\left\{ (x, y) \middle| \left(\frac{3}{5} - \alpha\right) M \leq x \leq \left(\frac{3}{5} + \alpha\right) M, 1 \leq x \leq N \right\}, \quad (5)$$

where M and N are the height and width of input images, $\alpha$ is a parameter and its value plays an important role in tradeoff between the speed and the robustness of the proposed algorithm. The robustness of the proposed algorithm is increased with a larger $\alpha$ while its speed is reduced. Small $\alpha$ is selected if there is no moving object in differently exposed images. It should be mentioned that the center line of cropped images is at the bottom half of input images. Such a selection is based on an assumption that statistically moving objects usually appear above the top half of images.

An further alternative solution for CRF estimation without image alignment may be used under the assumption that the LDR images have nearly same histograms.

It is observed that the CRF curve is monotonically increasing. Assuming two images $I_1, I_2$ with the identical scene in exposure time $\Delta t_1, \Delta t_2$ respectively, $E(x_1, y_1), E(x_2, y_2)$ are two radiances at different positions $(x_1, y_1)$ and $(x_2, y_2)$. The following relationship exists due to monotonic property:

$$E(x_1, y_1) \geq E(x_2, y_2) \Rightarrow Z_1(x_1, y_1) \geq Z_1(x_2, y_2), Z_2(x_1, y_1) \geq Z_2(x_2, y_2) \quad (6)$$

where $Z_i$ (i=1, 2) are the intensities in ith image. This implies that the exposure variations change the intensities, but keep the relative order of intensities. This fact leads to extracting such relationship of differently exposed images.

Let P be a pixel with intensity $Z(P)$, and $Q(j)$ (j=1, 2, 3, 4) the 4-connected neighborhood pixel of P. Illustratively, for example, if P is $(x, y)$, $Q(1)$ may be $(x-1, y)$, $Q(2)$ may be $(x+1, y)$, $Q(3)$ may be $(x, y+1)$, and $Q(4)$ may be $(x, y-1)$.

However, definition of Q(j) is not limited thereto. A relative value for each pixel for the plurality of pixels Q(j) in the neighborhood of the pixel P may be determined by equation (3)

A number representing the pixel values of the plurality of pixels Q(j) in the neighborhood of pixel P relatively to the pixel value of pixel P may be determined by equation (4).

T(P) can be seen to reveal the image micro-structure, which is photometrically invariant to monotonic transform of intensity function. Therefore, the images in different exposures may be unified by such transform.

Accordingly, the transforms by equations (3), (4) convert the original images with different exposures $I_k \in \mathbb{R}^{M \times N}$ (k=1, 2, ... q) into the unified feature (LTP) images $F_k \in \mathbb{R}^{M \times N}$ (k=1, 2, ... q). Such transforms may be viewed as a normalized process which keeps the local structure of differently exposed images. One of the advantages is that such transform has very low computation and low sensitivity to changes in intensities.

The determination of the parameter δ may be dependent on the intensity relationship of the images aligned. A comparagram may be employed as an efficient tool to describe such relationship according to one embodiment.

The comparagram is defined as a two-dimensional joint histogram between two images $I_1$ and $I_2$. Let n be the total number of grayscales within images $I_1$ and $I_2$, the comparagram $C(Z_1^i, Z_2^j) \in \mathbb{R}^{n \times n}$ represents the number of pixels which satisfies $I_1(x, y)=Z_1^i$ and $I_2(x, y)=Z_2^j$ simultaneously wherein i means the ith grayscale in images $I_1$ and j means the jth grayscale in image $I_2$. A comparagram captures information about the pixel relationship between the two images while discarding spatial information in the images.

Figure 3:
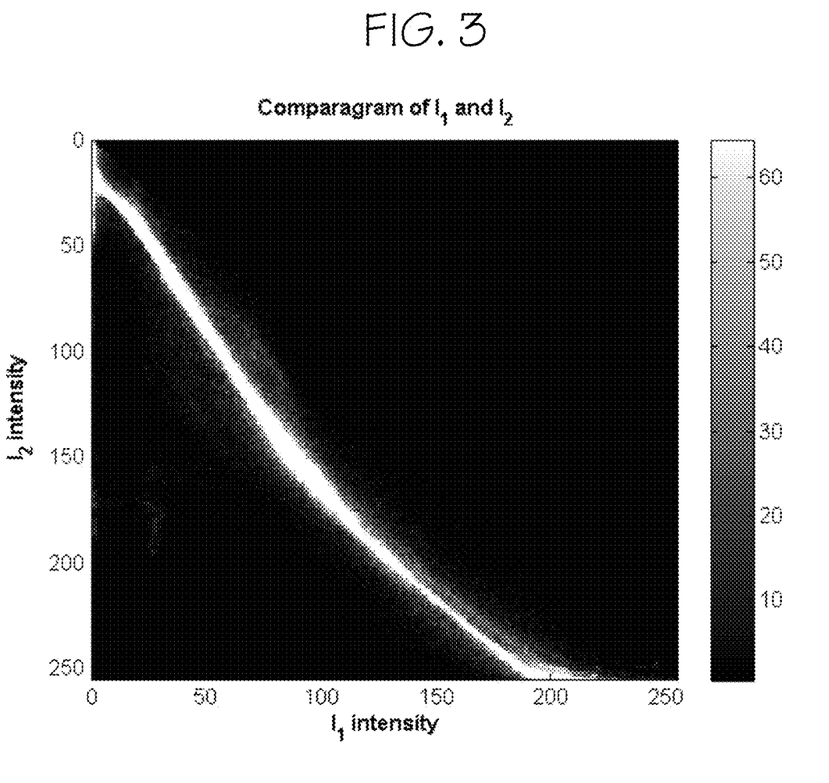
FIG. 3 shows a comparagram of two differently exposed images.

FIG. 3 shows a comparagram of two differently exposed images. The horizontal axis is the intensity in the image $I_1$. The vertical axis is the intensity in the image $I_2$. The bar on the right of FIG. 3 shows that different brightness represents different number of pixels. It can be observed from FIG. 3 that the comparagram is distributed as an image instead of a curve. This verifies that two images with different exposures do not strictly follow the monotonous property as depicted in expression (2).

It may be seen from the comparagram that the projection of $C(Z_1^i, Z_2^j)$ onto image $I_1$ is actually the histogram $H_2$ of image $I_2$. Setting $Z_1 = \alpha$, the resulted vector $H_2(\alpha)$ indicates the distribution of intensities in image $I_2$ corresponding to $I_1(x, y) = \alpha$. It may be easily observed the following two properties from the comparagram:

(1) The histograms $H_1(Z)$ of image $I_1$ and $H_2(Z)$ of image $I_2$ are not identical;
(2) The distributions $H_2(Z_1^i)$ (i=1, 2 ... n) of the intensities in image $I_2$ corresponding to different intensities $Z_1^i$ in image $I_1$ have different scatters.

The scatters have similar characters of parameter δ, which indicate the intensity relationship. The difference between them is that the parameter δ describes the intensity variations in different locations, while the scatters depict the distributions (i.e., histogram) of intensity variations in different grayscale levels. The above observations lead to the adaptive method to determine the parameter δ for each grayscale level using weighting variances according to one exemplary embodiment.

Suppose $I_1$ is the reference image. For each grayscale level $Z_1^i$, (i=1, 2, ... n), find $$Z_2^J = \arg\max_{j=1,2,\ldots n} (C(Z_1^i, Z_2^j)) \tag{5}$$

i.e., $Z_2^J$ is the majority of grayscale level in image $I_2$ mapping from $Z_1^i$ in image $I_1$, and obtain the histogram $H_2(Z_1^i)$. The parameter $\delta_2$ for image $I_2$ may be calculated as weighting variance as follows:

$$\delta_2(Z_1^i) = \sqrt{\frac{\sum_{j=1}^{n} W_2^j H_2(Z_1^i) * (Z_2^j - Z_2^J)^2}{\sum_{j=1}^{n} W_2^j H_2(Z_1^i)}} \tag{6}$$

where $W_2^j$ is the weighting which is defined as $$W_2^j = \exp\left(-\frac{(Z_2^j - Z_2^J)^2}{\sigma^2}\right) \tag{7}$$

Similarly, assuming image $I_2$ is the reference image, $\delta_1(Z_2^j)$ may be found for each grayscale level $Z_2^j$, (j=1, 2, ... n) as follows:

$$\delta_1(Z_2^j) = \sqrt{\frac{\sum_{i=1}^{n} W_1^i H_1(Z_2^j) * (Z_1^i - Z_1^I)^2}{\sum_{i=1}^{n} W_1^i H_1(Z_2^j)}} \tag{8}$$

and the final result for parameter δ in each grayscale level Z is determined as follows:

$$\delta(Z) = \max\{\delta_1(Z), \delta_2(Z)\} \tag{9}$$

It can be seen from equations (6) and (8) that the parameter δ tolerates the error resulted from imaging system and image processing, while tries to suppress effect of image noise by using weighting function and histogram counts.

Estimation of aligning parameters (or transform parameters) according to various exemplary embodiments is provided as follows.

It is noted that the images $F_k \in \mathbb{R}^{M \times N}$ (k=1, 2, ... q) may be viewed as feature images (ternary-string features) of original images $I_k \in \mathbb{R}^{M \times N}$ (k=1, 2, ... q). Image alignment may be performed using the cropped feature images $\bar{F}_k \in \mathbb{R}^{M_1 \times N_1}$ (k=1, 2, ... q) by conventional matching algorithms, for example, the alignment may be performed by the following similarity measure:

$$\Theta^* = \arg\min_{\Theta} |\bar{F}_i(x, y) \oplus \bar{F}_j(x, y, \Theta)| \tag{10}$$

where $\Theta$ is the transform parameters (rotation as well as translations in x, y directions), $\Theta^*$ is the optimal parameters obtained, $\oplus$ represents the Hamming distance in which the image similarity is measured.

On the other hand, the feature images $\overline{F}_k \in \mathbb{R}^{M_1 \times N_1}$ (k=1, 2, ... q) may be regarded as the normalized images of differently exposed images, in which the 3-value coded intensities are in range of [0, 80], and accordingly the intensity-based methods may be employed for image alignment. In the following, a fast optimization via linear model is provided according to one embodiment.

Let $I_1$ and $I_2$ be two LDR images to be aligned, and $\overline{F}_1$ and $\overline{F}_2$ be the cropped ternary coded images of $I_1$ and $I_2$ obtained from equations (3) to (4) respectively. Suppose that the translations between $I_1$ and $I_2$ are a and b in x, y directions respectively, and the rotational angle is $\theta$. Then $$\overline{F}_2(x,y) = \overline{F}_1(x\cos\theta - y\sin\theta + a, y\cos\theta + x\sin\theta + b) \quad (11)$$

Assuming the movement is small, $\sin\theta$ and $\cos\theta$ may be expanded to the first two terms in Taylor series according to one exemplary embodiment, and again $\overline{F}_1$ may be expanded by Taylor series to the first order, then obtain the following linear equations:

$$a\sum\left(\frac{\partial \overline{F}_1}{\partial x}\right)^2 + b\sum\frac{\partial^2 \overline{F}_1}{\partial x \partial y} + \theta\sum R\frac{\partial \overline{F}_1}{\partial x} = \sum\frac{\partial \overline{F}_1}{\partial x}(\overline{F}_1 - \overline{F}_2) \quad (12)$$

$$a\sum\left(\frac{\partial^2 \overline{F}_1}{\partial x \partial y}\right)^2 + b\sum\left(\frac{\partial \overline{F}_1}{\partial y}\right)^2 + \theta\sum R\frac{\partial \overline{F}_1}{\partial y} =$$

$$\sum\frac{\partial \overline{F}_1}{\partial y}(\overline{F}_1 - \overline{F}_2)$$

$$a\sum R\frac{\partial \overline{F}_1}{\partial x} + b\sum R\frac{\partial \overline{F}_1}{\partial y} + \theta\sum R^2 = \sum R(\overline{F}_1 - \overline{F}_2)$$

where $$\frac{\partial \overline{F}_i}{\partial x} = -\frac{2x}{\sigma^2}g(x,y)\overline{F}_i(x,y) \; i=1,2 \quad (13)$$

$$\frac{\partial \overline{F}_i}{\partial y} = -\frac{2y}{\sigma^2}g(x,y)\overline{F}_i(x,y) \; i=1,2 \quad (14)$$

$$R = x\frac{\partial \overline{F}_1}{\partial y} - y\frac{\partial \overline{F}_1}{\partial x} \quad (15)$$

and g(x, y) is the Gaussian function defined as follows:

$$g(x,y) = \exp\left(-\frac{x^2+y^2}{\sigma^2}\right) \quad (16)$$

Therefore, the parameters may be obtained via the least squared estimation and the solution may achieve sub-pixel accuracy.

It is however noted that the Taylor approximation in equation (12) is accurate only if the translation and rotation between the two images are small. To register two images with large translation, the coarse-to-fine technique using the Gaussian pyramid may be employed according to one embodiment.

The Gaussian pyramid consists of low-pass filtered, reduced density image of the preceding level of the pyramid, where the base level is defined as the original image. More formally, for a cropped LTP image $\overline{F}(x,y) \in \mathbb{R}^{M_1 \times N_1}$, the Gaussian pyramid is defined recursively as follows:
For level 0:

$$G_0(x,y) = \overline{F}(x,y) \quad (17)$$

For level l:

$$G_l(x,y) = \sum_{m=-2}^{2}\sum_{n=-2}^{2} w(m,n) G_{l-1}(2x+m, 2y+n) \quad (18)$$

where w (m, n) is the Gaussian kernel convolved with $G_{l-1}(x, y)$.

Assuming two images with translations $T_x$ in x direction and $T_y$ in y direction, and L-level Gaussian pyramids are built, the translations $T_x^L$, $T_y^L$ in the Lth level image $G_L(x, y)$ are $$T_x^L = \frac{T_x}{2^L}, \; T_x^L = \frac{T_x}{2^L} \quad (19)$$

Therefore, more levels lead to smaller translations. The level L is determined by the smallest image, which may be no less than 16×16.

Estimation of rotational angle by histogram-based matching is provided according to one exemplary embodiment as follows.

It is highlighted that the Gaussian pyramids change the image translations in different levels but do not affect the image rotation. Large rotation results in poor performance of the linear model in equation (12). Accordingly, histogram-based matching to detect rotational angles is provided according to one embodiment.

Let $\overline{F}_1, \overline{F}_2 \in \mathbb{R}^{M_3 \times N_3}$ be the cropped feature images obtained from equation (4) respectively. For a feature image $\overline{F}_i$(i=1, 2), the histogram in x direction may be obtained:

$$H_i^x(j) = (h_0^x, h_1^x, h_2^x \ldots h_{80}^x) \; i=1,2, j=1,2,\ldots N_1 \quad (20)$$

Then the rotational angle $\theta^x$ may be found:

$$\Theta(\theta^x) = \underset{\theta}{\operatorname{argmin}} \sum_{j=1}^{N_1} |H_1^x(j) - H_2^x(j, \Theta(\theta))| \quad (21)$$

Similarly, the histogram may be obtained by projecting the feature image $\overline{F}_i$(i=1, 2), in y direction:

$$H_i^y(j) = h_0^y, h_1^y, h_2^y \ldots h_{80}^y \; i=1,2, j=1,2,\ldots M_1 \quad (22)$$

and the rotational angle $\theta^y$ may be found:

$$\Theta(\theta^y) = \underset{\theta}{\operatorname{argmin}} \sum_{j=1}^{M_1} |H_1^y(j) - H_2^y(j, \Theta(\theta))| \quad (23)$$

If $|\theta^x - \theta^y| \le \zeta$, where $\zeta$ is a small value, e.g. $0 < \zeta < 1$, it may be confirmed that the estimations in both x direction and y direction are correct, and the final result may be determined as follows:

$$\theta_0 = (\theta^x + \theta^y)/2 \quad (24)$$

It is seen that the histogram matching decouples the x, y spaces so that the searching time is $O(d^2)$ instead of $O(d^3)$. The angle $\theta_0$ is then served as initial parameter for further optimization shown in equation (12).

In one exemplary embodiment, progressive image alignment is provided.

To align images, an initial reference image may be selected. As the images in different exposures for HDR synthesis may have great variations of intensities, an image with less saturation may be chosen as reference so that more features may be extracted. Illustratively, the reference image $k_0$ may be determined by the following criterion:

$$k_0 = \underset{k}{\mathrm{argmax}}\{(i, j) \mid Z_{i,j}^k < 250 \text{ and } Z_{i,j}^k > 20\} \quad (25)$$

For the reference image, the translation may be set $[a(k_0), b(k_0)]=[0, 0]$, and rotation may be set $\theta(k_0)=0$, then other images may be aligned to it. As two images with great different exposures may have big difference in both tonal domain and spatial domain, it may be desirable to only align the consecutive images $(k_0-1)/(k_0+1)$ (only select $k_0+1$ as example below) by using the initial reference image. After estimating the transform parameters between images $k_0$ and $k_0+1$, the image $k_0+1$ may be served as a new reference to align the image $k_0+2$. This may also be referred to as progressive image alignment. The transform parameters may be finally calculated as follows:

$$[a(k_0+1),b(k_0+1)]=[T_x(k_0,k_0+1),T_y(k_0,k_0+1)]+[a(k_0),b(k_0)]$$

$$\theta(k_0+1)=\beta(k_0,k_0+1)+\theta(k_0) \quad (26)$$

where $T_x(k_0, k_0+1)$, $T_y(k_0, k_0+1)$, and $\beta(k_0, k_0+1)$ are the transform parameters of images $k_0+1$ with respect to image $k_0$.

Figure 4:
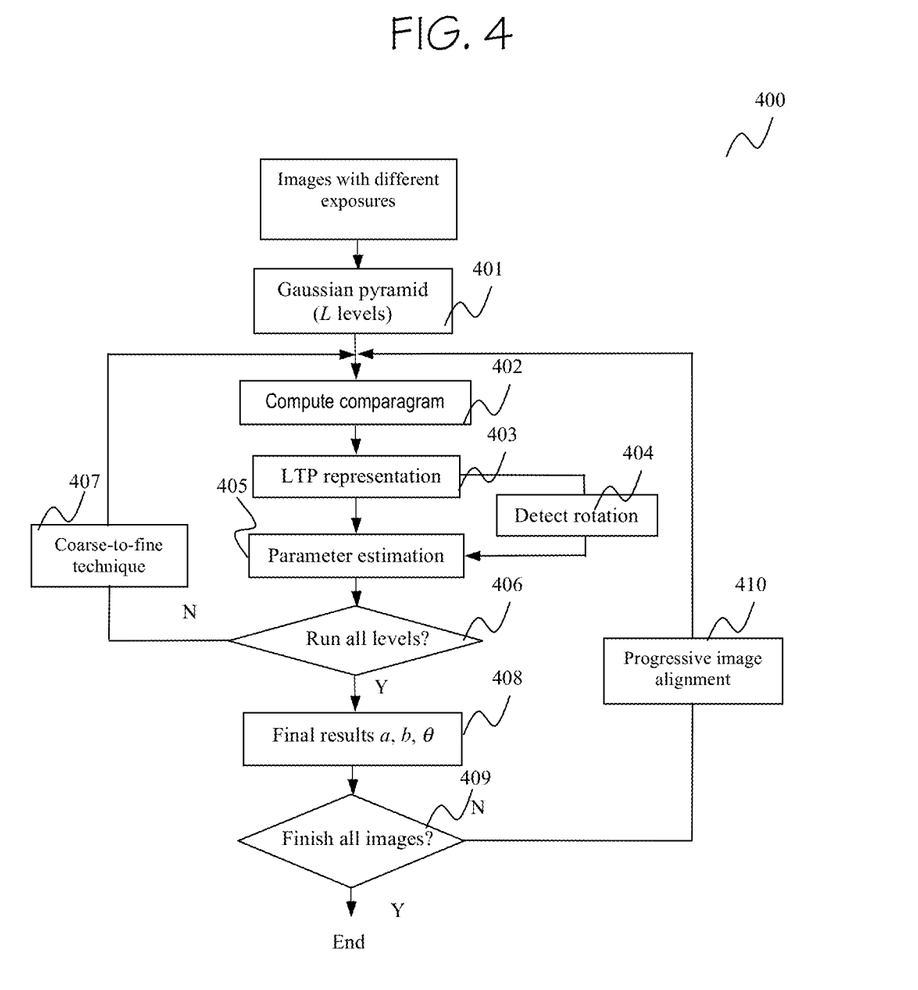
FIG. 4 shows a flowchart of the method of aligning a plurality of first digital pictures according to an exemplary embodiment.

FIG. 4 illustrates a flowchart 400 for aligning a plurality of first digital pictures with different exposures according to one exemplary embodiment.

In 401, a coarse-to-fine technique using Gaussian pyramid may be applied to each of the plurality of first digital pictures, such that L levels of reduced density images is generated for each of the plurality of first digital pictures.

In 402, a comparagram may be computed. The alignment process may be carried out each time for two consecutive images, and the each newly aligned image may serve as the reference image for the next alignment. The alignment process may continue until all the images are aligned. Optionally, the plurality of first digital picture may be first ranked according to saturation, and the alignment process may start from the images having relatively less saturation. A comparagram may be computed for each two consecutive images such that the parameter δ may be determined. Illustratively, two first digital pictures with least saturation may be firstly selected to compute comparagram.

In 403, a second digital picture may be generated for each first digital picture using the equations (3) and (4) and the parameter δ determined in 402.

It should be noted that 402 may alternatively include the normalization of the images by IMFs (e.g. without usage of a comparagram) and that 403 may include generating the LTP representation and the generation of cropped LTP-coded images.

In 404, rotation between the two consecutive pictures may be detected, e.g. using the equations (20) to (24).

In 405, the aligning parameters are estimated for the two consecutive digital pictures based on the second digital pictures and the detected rotation.

In 406, it is determined whether all L levels of pyramids have been run. If not, it goes to 407, in which the coarse-to-fine technique is applied again and then goes to process 402. If in 406 it is determined all L levels of pyramids have been run, it goes to 408, in which the final alignment (or transform) parameters are obtained, for example, using equation (26).

It should be noted that the Lth level is determined by the smallest image size which is for example no less than 16 by 16.

In 409, it is determined whether the alignment parameters have been determined for each pair of consecutive first digital pictures. If not, it goes to process 410 wherein the next consecutive first digital picture is selected, and thereafter it goes back to 402. If it is determined in 409 that all the images have been processed, then the plurality of first digital pictures are aligned using the aligning parameters determined.

In summary, various embodiments provide a novel LTP method to cope with differently exposed images. Essentially, the LTP represents the consistent micro-structures of differently exposed images, which is photometrically invariant to monotonic transform of intensity function, while at the same time, tolerates the image error arising from imaging system (for example, quantization, mosaicing), image processing (for example, interpolation) and alleviates the effect of image noise. This representation is pixel-wise instead of feature extraction, which is independent of image saturation. An automatic and efficient method is provided to adaptively determine the LTP features by the comparagram derived from the underlying images. Then a fast optimal scheme is provided to compute the transform parameters (or aligning parameters). To solve large camera movement and large intensity variations accurately and robustly, the rotational angle may be initially detected by histogram-based matching. Further, the coarse-to-fine technique by Gaussian Pyramid and the progressive image alignment may be implemented. The results show that the LTP method as described herein may be used in both static and dynamic scenes, the situation that the scenes have high dynamic range as well the cases that the underlying images are captured with large movement of camera.

Various embodiments provide a local ternary pattern (LTP) which represents the consistent micro-structure of differently exposed images. An LTP is invariant of exposure times. It is pixel-based and is independent of image saturation. Various embodiments further provide a method that determines the LTP features by performing a two-dimensional joint histogram between the reference image and a target image. Various embodiments further provide a method that aligns differently exposed images by estimating the transform parameters. This may be performed by conventional matching algorithm. However, the solution as provided improved this by using a fast optimizing linear model in which the transform parameters are estimated using the first two terms of the Taylor series. In order for the estimation to be accurate, a coarse-to-fine technique may be used for correcting translation between the two images, and a histogram-based matching technique may be used for correcting rotational angles between the two images. Various embodiments further provide a method that performs progressive image alignment wherein an image with less saturation is selected as the initial reference image and alignment is carried out with a neighboring image, one image at a time. Each newly aligned image may serve as the reference image for the next alignment.

Various embodiments provide a local ternary pattern (LTP) to represent invariant features of differently exposed images. This pattern is pixel-wise instead of feature extraction, which is independent of image saturation. Essentially, LTP represents the consistent micro-structure of differently exposed images which is invariant of exposure times. A method is provided to adaptively determine the LTP features by the comparagram, i.e., two-dimensional joint histogram between two images, so that the LTPs are robust and consistent against image errors resulted from imaging system, image processing and image noise. Then a fast optimal scheme is developed to determine the transform parameters. To cope with large camera movement and large intensity variations, image rotation is initially detected by histogram-based matching, and the coarse-to-fine technique by Gaussian Pyramid and the idea of progressive image alignment are implemented.

According to various embodiments, a method to align differently exposed images is provided. According to one embodiment, the method comprises a normalization module (e.g. a normalization step) and an alignment module (e.g. an alignment step). For the normalization module, the differently exposed images are first normalized using bidirectional IMF. Such procedure can greatly improve accuracy of normalization because more reliable intensities are used. Then the normalized images are represented in LTP-coded images, which represent the consistent micro-structures of differently exposed images. It can be shown that the LTP representation is more resistant to noise and error resulted from imaging system and image processing, for example, quantization, interpolation and so on. Then the transform parameters are computed. To solve large camera movement and large intensity variations accurately and robustly, the rotational angle may be initially detected by histogram-based matching; the coarse-to-fine technique by Gaussian Pyramid and the idea of progressive image alignment are implemented. To further improve efficiency, the alignment may be performed by cropped images. Experimental results carried out on a variety of static and dynamic images demonstrate that the proposed method is robust to 4 EV, and the operation time is around 20 second for 3M images in Matlab environment. The results show that the method can be used in both static and dynamic scenes; the situation that the scenes have high dynamic range as well the cases that the underlying images are captured with large movement of camera.

The method for aligning images according to one embodiment comprises a step of a bidirectional IMF before the LTP step to (at least roughly) normalize the differently exposed images before the LTP step. This has the advantage of not needing to use an adaptive method to determine the threshold for each gray level. Thus, the comparagram method described above for determining the LTP is not necessary. See 402 in FIG. 4 where IMF normalization may be done instead of the comparagram approach.

According to one embodiment, the method comprises usage of the option to allow the use of cropped images for the image alignment method. This option helps to improve efficiency. However, depending on the image content, it may also result in a poorer image quality. This option may therefore be used depending on the image content as well as the hardware requirement (e.g. running this method with a full image on a pc and running it with a cropped image on a smartphone, for example).

Figure 5:
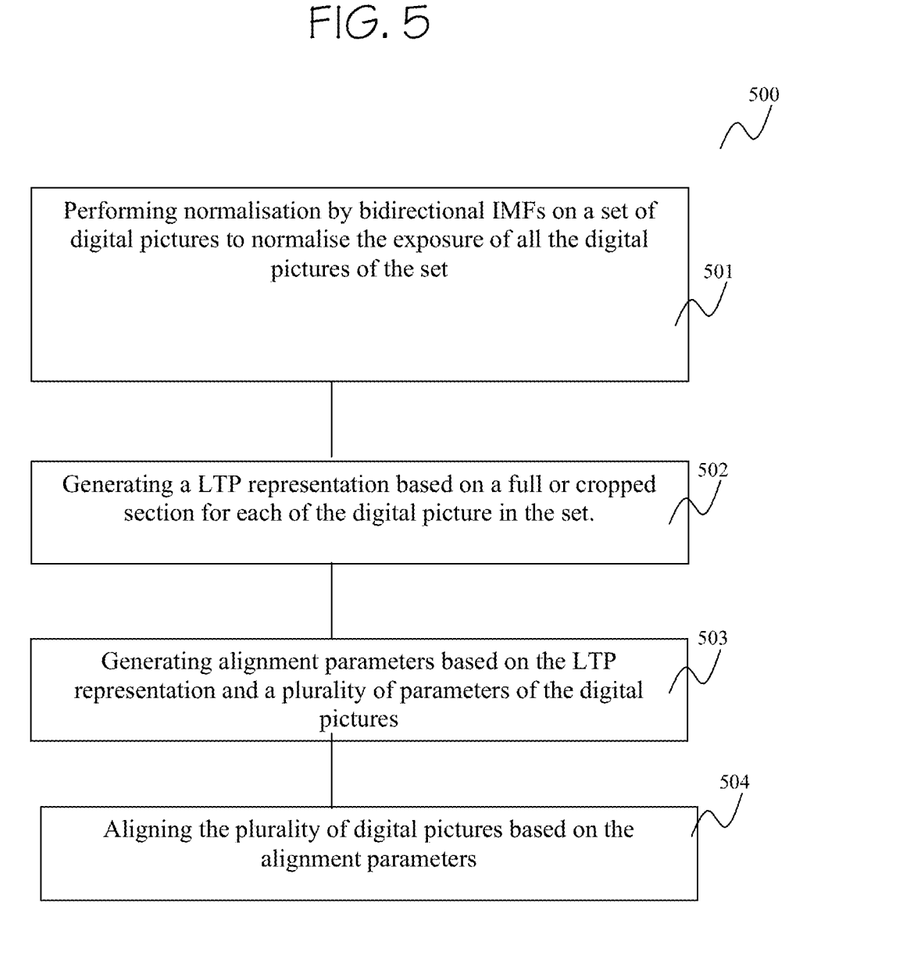
FIG. 5 shows a flowchart illustrating an alignment method according to an embodiment.

According to one embodiment, a procedure is carried out as illustrated in FIG. 5.

FIG. 5 shows a flowchart 500 illustrating an alignment method for a plurality of digital images according to an embodiment.

In 501, normalization by bidirectional IMFs is performed. The exposure of the plurality of images is normalized (such that all images have the same exposure value). The normalization of the exposure makes the subsequent processing in 502 to 503 easier.

In 502, an LTP representation (also referred to as LTP-coded image) is generated for each of the normalized images.

In 503, an alignment algorithm is run on either the full or a cropped LTP-coded image created in 502 for each of the plurality of digital images to create one or more alignment parameters (e.g. a translation vector and/or a rotation angle).

In 504, each digital image is aligned to create an aligned digital image based on the one or more alignment parameters created for the digital image. Each aligned digital image may be generated to have the same exposure value as the original digital image, i.e. the exposure level may be left unchanged by the alignment.

While the invention has been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method for aligning a plurality of first digital pictures, each first digital picture comprising a plurality of pixels wherein each pixel is associated with a pixel value, the method comprising:
   generating, by a processor, a second digital picture for each first digital picture,
   wherein generating the second digital picture for the first digital picture comprises determining, for each of a plurality of pixels of the first digital picture, a number representing the pixel values of pixels in a neighborhood of the pixel relatively to the pixel value of the pixel;
   assigning, by a processor, the number as a pixel value to a pixel of the second digital picture corresponding to the pixel of the first digital picture;
   generating, by a processor, aligning parameters based on the plurality of second digital pictures; and
   aligning, by a processor, the plurality of first digital pictures based on the aligning parameters;
   wherein determining, for each of a plurality of pixels of the first digital picture, a number representing the pixel values of pixels in the neighborhood of the pixel relatively to the pixel value of the pixel comprises
   determining a relative value for each pixel of the pixels in the neighborhood of the pixel based on comparison of the pixel value of the pixel and the pixel value of the pixel in the neighborhood of the pixel; and
   determining the number representing the pixel values of the pixels in the neighborhood of the pixel relatively to the pixel value of the pixel based on the determined relative values;
   wherein determining a relative value for each pixel of the pixels in the neighborhood of the pixel based on comparison of the pixel value of the pixel and the pixel value of the pixel in the neighborhood of the pixel comprises
   determining a difference between the pixel value of the pixel and the pixel value of the pixel in the neighborhood of the pixel; and
   comparing the difference with a threshold value;
   wherein the threshold value is determined based on a comparagram which is a two-dimensional joint histogram between a reference first digital picture and a target first digital picture of a plurality of first digital pictures.

2. The method according to claim 1, wherein when the difference is larger than the threshold value, the relative value is determined to be a first pre-determined value.

3. The method according to claim 1, wherein when the absolute value of the difference is smaller than or equal to the threshold value, the relative value is determined to be a second pre-determined value.

4. The method according to claim 1, wherein when the difference is smaller than opposite of the threshold value, the relative value is determined to be a third pre-determined value.

5. The method according to claim 1, wherein the number representing the pixel values of the pixels in the neighborhood of the pixel relatively to the pixel value of the pixel is determined to be sum of the relative value for each pixel of the pixels in the neighborhood of the pixel.

6. The method according to claim 5, wherein each relative value is weighed differently.

7. The method according to claim 1, further comprising: determining, for each pixel value of the reference first digital picture, a majority pixel value in the target first digital picture mapping from the reference first digital picture based on the comparagram.

8. The method according to claim 1, wherein the threshold value is determined based on a histogram for the target first digital picture.

9. The method of claim 1, wherein generating the second digital picture for the first digital picture comprises normalizing the exposure of the first digital picture and generating the second digital picture based on the first digital picture with normalized exposure.

10. The method of claim 9, wherein the exposure of the first digital picture is normalized by a bidirectional intensity mapping function.

11. The method of claim 1, wherein generating the second digital picture for the first digital picture comprises reducing the size of the first digital picture and generating the second digital picture for the first digital picture with reduced size.

12. The method according to claim 1, wherein the aligning parameters comprises translation in a first direction, translation in a second direction, and rotation angle, wherein the first direction is orthogonal to the second direction.

13. The method according to claim 12, wherein the aligning parameters are approximated using Taylor series.

14. The method according to claim 12, wherein generating the aligning parameter of translation in the first direction and the aligning parameter of translation in the second direction comprises generating reduced density second digital pictures.

15. The method according to claim 12, wherein generating the aligning parameter of rotation angle comprises determining, for each second digital picture, a histogram in a first direction and a histogram in a second direction for each second digital picture, the first direction being orthogonal to the second direction.

16. The method according to claim 1, wherein aligning the plurality of first digital pictures starts from the first digital pictures which have relatively low saturation.

17. A device for aligning a plurality of first digital pictures, each first digital picture comprising a plurality of pixels wherein each pixel is associated with a pixel value, the device comprising:
a first generator, comprising at least one processor, configured to generate a second digital picture for each first digital picture,
wherein generating the second digital picture for the first digital picture comprises determining, for each of a plurality of pixels of the first digital picture, a number representing the pixel values of a plurality of pixels in a neighborhood of the pixel relatively to the pixel value of the pixel;
an assigning unit, comprising at least one processor, configured to assign the number as a pixel value to a pixel of the second digital picture corresponding to the pixel of the first digital picture;
a second generator, comprising at least one processor, configured to generate aligning parameters based on the plurality of second digital pictures; and
a aligning unit, comprising at least one processor, configured to align the plurality of first digital pictures based on the aligning parameters;
wherein determining, for each of a plurality of pixels of the first digital picture, a number representing the pixel values of pixels in the neighborhood of the pixel relatively to the pixel value of the pixel comprises determining a relative value for each pixel of the pixels in the neighborhood of the pixel based on comparison of the pixel value of the pixel and the pixel value of the pixel in the neighborhood of the pixel; and
determining the number representing the pixel values of the pixels in the neighborhood of the pixel relatively to the pixel value of the pixel based on the determined relative values;
wherein determining a relative value for each pixel of the pixels in the neighborhood of the pixel based on comparison of the pixel value of the pixel and the pixel value of the pixel in the neighborhood of the pixel comprises
determining a difference between the pixel value of the pixel and the pixel value of the pixel in the neighborhood of the pixel; and
comparing the difference with a threshold value;
wherein the threshold value is determined based on a comparagram which is a two-dimensional joint histogram between a reference first digital picture and a target first digital picture of a plurality of first digital pictures.

* * * * *